United States Patent
Bayerl et al.

(10) Patent No.: US 10,460,428 B2
(45) Date of Patent: Oct. 29, 2019

(54) METHOD, HEAD-UP DISPLAY AND OUTPUT SYSTEM FOR THE PERSPECTIVE TRANSFORMATION AND OUTPUTTING OF IMAGE CONTENT, AND VEHICLE

(71) Applicant: Bayerische Motoren Werke Aktiengesellschaft, Munich (DE)

(72) Inventors: Tobias Bayerl, Olching (DE); Sean Brown, Munich (DE); Christoph Ciesla, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/126,901

(22) Filed: Sep. 10, 2018

(65) Prior Publication Data
US 2019/0005608 A1 Jan. 3, 2019

Related U.S. Application Data

(63) Continuation of application No. PCT/EP2017/052381, filed on Feb. 3, 2017.

(30) Foreign Application Priority Data

Mar. 11, 2016 (DE) .................. 10 2016 204 044

(51) Int. Cl.
*G06T 5/00* (2006.01)
*H04N 7/18* (2006.01)
(Continued)

(52) U.S. Cl.
CPC .............. *G06T 5/006* (2013.01); *B60K 35/00* (2013.01); *G02B 27/0101* (2013.01); *G06T 3/00* (2013.01);
(Continued)

(58) Field of Classification Search
CPC ......... G06T 3/00; G06T 3/0025; G06T 3/005; G06T 3/4007; G06T 3/4038; G06T 3/608; G09G 5/006; G09G 5/363; H04N 7/18
(Continued)

(56) References Cited

U.S. PATENT DOCUMENTS 6,192,393 B1   2/2001   Tarantino et al.
2002/0122113 A1   9/2002   Foote
(Continued)

FOREIGN PATENT DOCUMENTS

WO   WO 2006/031214 A1   3/2006

OTHER PUBLICATIONS

International Search Report (PCT/ISA/210) issued in PCT Application No. PCT/EP2016/081358 dated Mar. 8, 2017 with English translation (seven pages).
(Continued)

*Primary Examiner* — Michael Lee
(74) *Attorney, Agent, or Firm* — Crowell & Moring LLP

(57) ABSTRACT

A method, a head-up display and a display system for the perspective transformation and displaying of rendered image content, as well as a corresponding vehicle, are provided. In the perspective transformation and outputting method, the image content to be displayed is subdivided into a plurality of tiles, and the individual tiles are each transformed in perspective using perspective transformation. The individual tiles that have been transformed in perspective are then combined to form a transformed image content, and the image content transformed in perspective is projected onto a projection area of the head-up display or displayed on a display unit.

16 Claims, 5 Drawing Sheets

(51) Int. Cl.
*G06T 3/00* (2006.01)
*G02B 27/01* (2006.01)
*G09G 5/00* (2006.01)
*G09G 5/36* (2006.01)
*B60K 35/00* (2006.01)
*G06T 3/40* (2006.01)
*G06T 3/60* (2006.01)
*G06T 1/20* (2006.01)
*G06T 5/50* (2006.01)
*G09G 5/377* (2006.01)

(52) U.S. Cl.
CPC ............ *G06T 3/005* (2013.01); *G06T 3/0025* (2013.01); *G06T 3/4007* (2013.01); *G06T 3/4038* (2013.01); *G06T 3/608* (2013.01); *G09G 5/006* (2013.01); *G09G 5/363* (2013.01); *B60K 2370/186* (2019.05); *B60K 2370/334* (2019.05); *G02B 2027/011* (2013.01); *G02B 2027/014* (2013.01); *G02B 2027/0123* (2013.01); *G06T 1/20* (2013.01); *G06T 5/002* (2013.01); *G06T 5/50* (2013.01); *G06T 2207/20021* (2013.01); *G06T 2207/20221* (2013.01); *G09G 5/377* (2013.01); *G09G 2360/122* (2013.01); *G09G 2360/18* (2013.01); *G09G 2380/10* (2013.01); *H04N 7/18* (2013.01)

(58) Field of Classification Search
USPC .......................................................... 348/744
See application file for complete search history.

(56) References Cited

U.S. PATENT DOCUMENTS

| | | |
|---|---|---|
| 2008/0062164 A1 | 3/2008 | Bassi et al. |
| 2011/0187903 A1* | 8/2011 | Kim ........................ H04N 5/217 348/241 |
| 2012/0013794 A1* | 1/2012 | Kido ........................ G06T 3/00 348/441 |
| 2013/0222386 A1 | 8/2013 | Tannhaeuser et al. |
| 2015/0160539 A1 | 6/2015 | Bassi et al. |

OTHER PUBLICATIONS

German-language Written Opinion (PCT/ISA/237) issued in PCT Application No. PCT/EP2016/081358 dated Mar. 8, 2017 (six pages).
International Search Report (PCT/ISA/210) issued in PCT Application No. PCT/EP2017/052381 dated Apr. 19, 2017 with English translation (seven pages).
German-language Written Opinion (PCT/ISA/237) issued in PCT Application No. PCT/EP2017/052381 dated Apr. 19, 2017 (six pages).

* cited by examiner

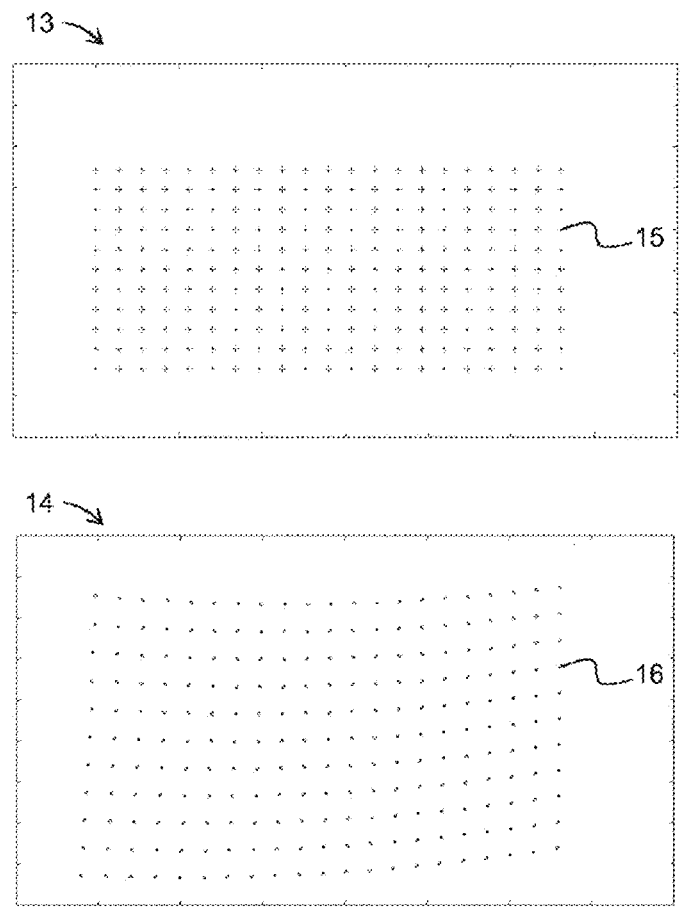
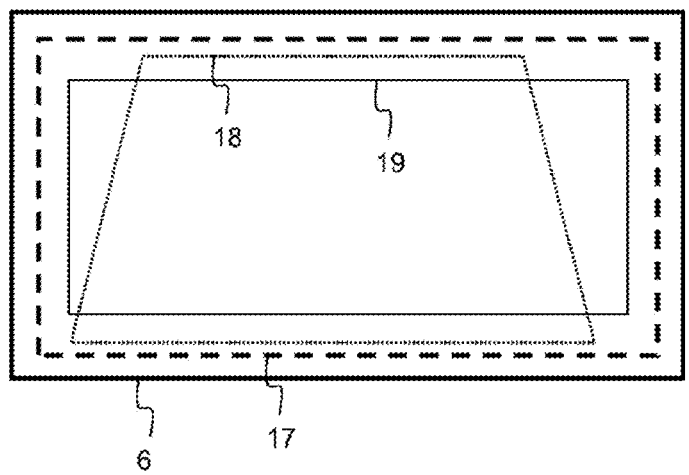
Fig. 6
Fig. 7

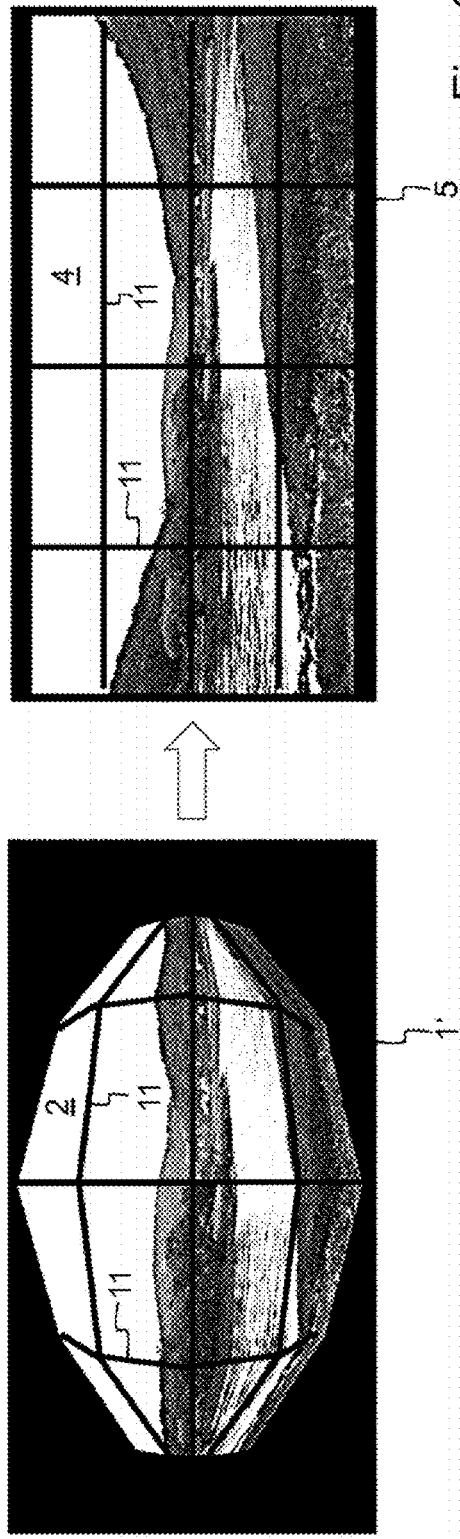

METHOD, HEAD-UP DISPLAY AND OUTPUT SYSTEM FOR THE PERSPECTIVE TRANSFORMATION AND OUTPUTTING OF IMAGE CONTENT, AND VEHICLE

CROSS REFERENCE TO RELATED APPLICATIONS

This application is a continuation of PCT International Application No. PCT/EP2017/052381, filed Feb. 3, 2017, which claims priority under 35 U.S.C. § 119 from German Patent Application No. 10 2016 204 044.8, filed Mar. 11, 2016, the entire disclosures of which are herein expressly incorporated by reference.

This application contains subject matter related to U.S. application Ser. No. 16/126,128, entitled "Method and Head-Up Display for the Perspective Transformation and Displaying of Image Content, and Vehicle" filed on even date herewith.

BACKGROUND AND SUMMARY OF THE INVENTION

The invention relates to a method, a head-up display and an output system for the perspective transformation and outputting, in particular display, of a rendered and/or captured image content, and to a vehicle comprising such a head-up display or output system.

Vehicles, in particular motor vehicles, generally comprise devices for displaying information. The information can both concern the operating state of the vehicle, for example the tank filling level, the speed, the status of the lighting system, etc., and facilitate operation of the vehicle for the driver, for example by displaying navigation information, displaying parking information, etc. In particular, it is possible to capture the environment of the vehicle in a sensor-based manner, for instance by means of one or more cameras, and to represent this vehicle environment for example as a plan view on a display in the vehicle. In order to display the information to the driver as conveniently as possible, head-up displays are used, which project the information to be displayed into the driver's natural field of view, where the driver perceives it visually as a virtual image. In this case, the natural field of view corresponds to the vehicle environment that is primarily to be taken into consideration for the operation of the vehicle, in particular the course of the road ahead of the vehicle. When the information is projected onto the windshield of the vehicle, for example, the driver can read off the information without having to shift his/her gaze from the road, which increases safety when using the vehicle.

By virtue of curvatures of optical elements of the head-up display and the windshield and the fact that the driver generally looks at the windshield at an angle, the image of the information to be displayed is distorted. Equally, however, a vehicle environment captured in a sensor-based manner, in particular by means of one or more cameras, is also distorted by curvatures of imaging elements of a capturing sensor device, for instance by one or more cameras using a fish-eye lens. In order to represent the information to the driver in a desired manner, in particular without distortion, i.e. clearly and readily recognizably, the imaging of the information to be displayed, in particular of the vehicle environment, therefore has to be adapted to the beam path from the image-generating device of the head-up display via optical elements of the head-up display and the windshield of the vehicle to the driver's eye, on the one hand, or to the imaging properties of an image-generating device, on the other hand.

For adaptation to the beam path or the imaging properties of the image-generating device, the information to be displayed is transferred as rendered or captured image content to a graphics module (graphics engine), which subjects the rendered or captured image content to a transformation. The transformation is designed to compensate for the distortion that arises for instance as a result of curved, in particular optical, elements of the head-up display or of the image-generating device, a curved windshield and/or a non-perpendicular viewing angle with respect to the windshield. In other words, the rendered image content is distorted by the transformation of the graphics module in order to enable the observer, in particular the driver, to visually perceive a rectified image of the rendered image content. Accordingly, however, an image content that has been captured, in particular in a sensor-based manner, can also be conditioned by the transformation in such a way that it can be perceived by the driver in a visually rectified manner, in particular directly, on an image-generating device.

It is an object of the invention to specify a method, a head-up display, a display system and a vehicle in which the transformation and outputting, in particular display, of a rendered image content and/or image content captured in a sensor-based manner is carried out more flexibly and more rapidly.

It is a further object of the invention to adapt a transformation that transforms a rendered image content more easily to changes in a beam path of a head-up display, caused for example by a change in the position of an image of the rendered image content on a projection surface of the head-up display.

It is a further object of the invention to adapt a transformation that transforms a captured image content more easily to imaging properties of an image-generating device, particularly if the image content captured in a sensor-based manner would be reproduced in a distorted manner on the image-generating device.

A first aspect of the invention relates to a method for the perspective transformation and display of a rendered image content by a head-up display, wherein the rendered image content, i.e. image content to be displayed, is divided into a plurality of regions, preferably tiles or rectangles. The tiles, or the image content contained in the individual tiles, are or is preferably transformed in each case by means of a perspective transformation and the individual, perspectively transformed tiles, or perspectively transformed image contents contained in the perspectively transformed tiles, are joined together to form a perspectively transformed image content. The perspectively transformed image content is projected onto a projection surface assigned to the head-up display.

A second aspect of the invention relates to a method for the perspective transformation and outputting of an image content captured, in particular in a sensor-based manner, for instance by means of one or more cameras, wherein the image content that has been captured, and in particular is to be displayed, is divided into a plurality of regions, preferably tiles or rectangles. The tiles, or the image content contained in the individual tiles, are or is preferably transformed in each case by means of a perspective transformation and the individual, perspectively transformed tiles, or perspectively transformed image contents contained in the perspectively transformed tiles, are joined together to form a perspectively transformed image content. The perspectively transformed image content is output.

A third aspect of the invention relates to a head-up display for the perspective transformation and display of a rendered image content, which head-up display comprises a control unit and a projection unit. In particular, the head-up display according to the invention is configured to carry out the perspective transformation and display of a rendered image content according to the first aspect of the invention. Preferably, the control unit comprises a first module, configured for dividing the rendered image content, i.e. image content to be displayed, into a plurality of regions, preferably tiles or rectangles, a second module, in particular a graphics module, configured for transforming the individual tiles, or the image content contained in the individual tiles, by means of a respective perspective transformation, in particular via a graphics programming interface, and a third module, configured for combining the individual, perspectively transformed tiles to form a transformed image content. Furthermore, the projection unit is preferably configured for projecting the perspectively transformed image content onto a projection surface assigned to the head-up display.

A fourth aspect of the invention relates to an output system for the perspective transformation and outputting of an image content captured, in particular in a sensor-based manner, for instance by means of one or more cameras, which output system comprises a control unit and an output unit, in particular data interface. In particular, the output system according to the invention is configured to carry out the perspective transformation and outputting of a rendered image content according to the second aspect of the invention. Preferably, the control unit comprises a first module, configured for dividing the captured image content, in particular image content to be displayed, into a plurality of regions, preferably tiles or rectangles, a second module, in particular a graphics module, configured for transforming the individual tiles, or the image content contained in the individual tiles, by means of a respective perspective transformation, in particular via a graphics programming interface, and a third module, configured for combining the individual, perspectively transformed tiles to form a transformed image content. Furthermore, the output unit is configured for outputting the perspectively transformed image content.

The first, second and third modules can be embodied in each case as hardware or software module. In particular, one or two modules can be embodied as software module and the remaining module(s) can be embodied as hardware module.

Preferably, a first, second or third module embodied as software module is implemented on one or more processors, in particular central processing unit or central processing units (CPU) of the control unit.

Preferably, a first, second or third module embodied as hardware module comprises at least one graphics card having a graphics processing unit (GPU).

A fifth aspect of the invention relates to a vehicle comprising a head-up display in accordance with the third aspect of the invention or a display system in accordance with the fourth aspect of the invention.

The features and advantages described with regard to the first aspect of the invention and the advantageous configuration thereof are also applicable to the second, third, fourth and fifth aspects of the invention and the advantageous configurations thereof, and vice versa.

An image content within the meaning of the invention should be understood to be, in particular, the optical image of one or more objects. By way of example, an object represented in an image is an image content (for instance a tree). While the image changes under a perspective transformation, i.e. becomes a different image, the image content however does not change (the changed image still shows the, possibly distorted, tree).

Capture within the meaning of the invention is carried out by means of a sensor device, in particular by means of one or more optical sensors. Preferably, in this case, one or more objects, for example a vehicle environment, is or are recorded. In this case, the object(s) can also be recorded (filmed) sequentially, that is to say substantially continuously. In particular, a captured object can be represented or optically imaged by means of a display, for instance a display unit or a projection unit.

A tile within the meaning of the invention should be understood to be, in particular, a portion or region of an image or of an image content. Preferably, a tile of an image or image content comprises a portion of the image content. Preferably, a tile has a rectangular shape. Alternatively, however, a tile can also have a different shape, for instance be embodied as a trapezoid, a parallelogram, a rhombus or a triangle. In particular, an image or image content can be decomposed or divided into tiles without any gaps.

Outputting within the meaning of the invention should be understood to be providing perspectively transformed image content. Preferably, the image content in this case is provided to a display unit for visual representation. Alternatively or additionally, the image content is provided as data, in particular via a data interface. Preferably, the image content in this case is provided to a driver assistance device, preferably for deriving control parameters for highly automatic or semiautomatic, in particular autonomous, driving.

A display unit within the meaning of the invention should be understood to be, in particular, an imaging device which can represent or display an image or image information. By way of example, a display unit can be embodied at least partly as a display or screen.

Within the meaning of the invention, the imaging properties of a display unit or of an image-generating device should be understood in particular always with respect to imaging properties of a sensor device that captures an image content, for instance of one or more cameras and/or lenses. By way of example, an image content captured by a fish-eye lens would be represented without distortion on a correspondingly curved display unit. In the case of a planar display unit, by contrast, a corresponding perspective transformation of the image content would be necessary in order to represent the image content without distortion on the display unit.

The invention is based in particular on the approach of dividing an image to be displayed, in particular a rendered or captured image content, which contains information to be displayed, into a plurality of regions, for example tiles, preferably rectangles or rectangular tiles, and transforming said regions separately by a respective perspective transformation. In other words, the perspective transformation of the image, i.e. of the rendered or captured image content, is carried out modularly. Afterward, the perspectively transformed regions, i.e. tiles, are combined again to form a now perspectively transformed image or image content, which, in or by a head-up display, is projected onto a projection surface or is output to an output unit, in particular displayed on a display unit, and can be visually perceived by an observer, in particular a driver, for instance in a vehicle comprising a head-up display, preferably without distortion, i.e. clearly and readily recognizably, on account of the perspective transformation performed.

In this case, the perspective transformation of individual tiles is preferably coordinated with the respective individual tile to be perspectively transformed. If a change in the beam path of the head-up display necessitates the adaptation of the image to be displayed, i.e. of the rendered image content, this can be brought about by coordination or adaption of individual perspective transformations.

Likewise, a change in the imaging properties of a sensor device that captures the image content, caused for example by the use of a different lens in front of a camera, as a result of which a perspectively transformed image content would be represented in a distorted manner by the display unit, can be compensated for by coordination or adaptation of individual perspective transformations.

In particular, the captured image content can be transformed in such a way that the driver can easily visually register and/or assess the perspectively transformed image content represented on the display unit. Preferably, the perspectively transformed image content can also be represented particularly memorably as a result.

In particular, it is not necessary to coordinate or to adapt each individual one of the perspective transformations, or to perform an adaptation, i.e. change, of a single global perspective transformation that transforms the entire image to be displayed, i.e. the entire rendered or captured image content. By comparison with the adaptation of each individual perspective transformation or a single global perspective transformation, the method according to the invention requires a lower computing power and therefore increases the frame rate at which the transformed images can be displayed by the head-up display or the display unit.

Preferably, the invention makes it possible to dispense with the perspective transformation of individual tiles if this is not necessary for a distortion-free representation or display of the combined and transformed image, i.e. image content. Particularly if only a portion of the image to be displayed, i.e. of the rendered or captured image content, has to be distorted or rectified by means of a perspective transformation or transformation for adaptation to the beam path of the head-up display or the observer's position, on the one hand, or to an imaging property of the display unit, on the other hand, by means of the modular perspective transformation it is possible to reduce the computational complexity for perspective distortion or rectification by not transforming individual tiles whose image content does not have to be adapted to the beam path or the imaging property.

Preferably, the perspective transformation of individual tiles, i.e. a modular perspective transformation, furthermore allows a memory- and computation-time-saving perspective transformation by means of a graphics module, which is preferably in widespread use and runs stably in particular on current microprocessors, in particular on different platforms. With further preference, said graphics module is designed to process vector graphics in particular with hardware acceleration, such that it is possible to carry out individual perspective transformations on a vector basis particularly rapidly and efficiently.

Overall, the invention enables rapid and flexible transformation and display of a rendered or captured image content.

Preferably, the perspectively transformed image content can be output to a driver assistance device and be used for determining control parameters for highly automatic or semiautomatic, in particular autonomous driving. In this case, the image content is preferably processed by image recognition algorithms known from the prior art, wherein the image content is preferably perspectively transformed in such a way that said algorithms can be implemented particularly reliably and/or efficiently.

By way of example, it is possible, on the basis of the perspectively transformed image content, to ensure, in particular directly in the vicinity of the vehicle, accurate determination of objects or a clearance, taking account of which the vehicle can be controlled reliably, i.e. in a manner free of collisions.

In one advantageous configuration, the perspectively transformed image content is displayed on a display unit. As a result, the image content captured in a sensor-based manner can be visually perceived easily and clearly by a driver, in particular on an arbitrary display.

In a further advantageous configuration, the individual tiles are transformed in such a way that the perspectively transformed image content is represented by the display unit in an uncompressed manner, in particular without distortion, in at least one first region, in particular in a center of the image or of the image content, and in a compressed manner, i.e. in a distorted manner, in at least one second region, in particular at the image edge or at the edge of the image content. As a result, the image content can advantageously be represented nonlinearly, such that, for example, in a plan view of the vehicle and/or the surroundings of the vehicle, even with a large viewing angle, details directly in the vicinity of the vehicle can be represented readily recognizably.

In a further advantageous configuration of the method for the perspective transformation and outputting, in particular display, of a rendered or captured image content, during the transformation each individual tile is perspectively transformed with regard to at least one of the following features: trapezoid shape, curvature, stretching and/or compression, rotation, offset. In particular, each individual tile can also be perspectively transformed by means of a combination of at least two of these features. A reliable adaptation of the image content to be displayed to the beam path of the head-up display or the imaging properties of the display unit is possible as a result.

In a further advantageous configuration of the method for the perspective transformation and outputting, in particular display, of a rendered or captured image content, adjoining tiles have overlapping image contents. In particular, the overlapping image contents each have a width of one, two or three pixels. This ensures that the perspectively transformed tiles, during the process of combining to form a perspectively transformed image content, likewise have overlapping, perspectively transformed image content or the edges of the perspectively transformed tiles terminate flush, in particular. In particular, this reliably prevents the combined, perspectively transformed image content from having regions which are not covered by at least one perspectively transformed tile and are therefore represented as color-neutral, in particular black or white, pixels. Preferably, this feature of the method also prevents said regions from arising by means of applying an edge smoothing, in particular by means of a smoothing filter.

In a further advantageous configuration of the method for the perspective transformation and outputting, in particular display, of a rendered or captured image content, the image content is present as raster graphics, wherein individual pixels of a tile are displaced by the perspective transformation. As a result, the rendered or captured image content can be divided particularly easily into different regions, preferably tiles or rectangles or rectangular tiles, wherein in each case a predefined number of pixels of the raster graphics are assigned to a region, or to a tile. The individual pixels of the raster graphics that belong to a respective tile are displaced by the perspective transformation. Consequently, the perspective transformation can be realized particularly easily.

Preferably, the raster graphics have a specific color depth, in particular 32, 24, 16, 8 or 4 bits. With further preference, the raster graphics can also have a color depth that lies between these values. With further preference, the raster graphics can also have a color depth that is greater than 32 bits or less than 4 bits. With further preference, different pixels of the raster graphics each have different color depths. In particular, preferably, some contiguous pixels of the raster graphics which respectively belong to an individual tile have in each case the same color depth. Particularly preferably, the color depth of an individual tile has a magnitude only such as is necessary for the true-color representation of the image content contained in the individual tiles. As a result, in particular, the rendered image content requires particularly little memory space, in particular in a buffer memory, and the perspective transformations of the tiles can be carried out particularly efficiently.

In a further advantageous configuration of the method for the perspective transformation and outputting, in particular display, of a rendered or captured image content, an interpolation, in particular a linear interpolation, of individual pixels of a tile, in particular of the pixels which adjoin pixels displaced by the perspective transformation and/or lie between said pixels, is carried out during the perspective transformation. This reliably avoids the situation in which regions having pixels to which no color value was assigned arise. Preferably, the number of pixels per tile is low, such that individual pixels are not displaced over large distances during the perspective transformation. In this case, in particular, a linear interpolation of the pixels lying between the pixels displaced during the perspective transformation yields a perspectively transformed image content whose image generated by a head-up display or a display unit can be visually perceived distinctly and clearly, i.e. in particular without artifacts. A linear interpolation causes in particular only a low computational complexity, that is to say that the burden for a calculating processor is low, for which reason the perspective transformation can be carried out rapidly and efficiently.

In a further advantageous configuration of the method for the perspective transformation and outputting, in particular display, of a rendered or captured image content, the individual tiles are perspectively transformed by multiplication by a transformation matrix, which allows the use of vector graphics technology. Preferably, the transformation matrix is a 3×3 matrix. Multiplication by a transformation matrix is a particularly simple and precise way of carrying out a transformation. A corresponding perspective transformation can therefore be carried out particularly rapidly and efficiently, in particular by a graphics module. In particular, it is therefore possible to achieve, for the frame rate at which rendered or captured image contents are perspectively transformed, a value of 30 to 90, preferably of 45 to 75, particularly preferably of substantially 60, perspectively transformed image contents per second. In one particularly advantageous configuration of the method, it is possible to achieve a value of 90 to 160, preferably of substantially 120, perspectively transformed image contents per second.

Preferably, during the matrix multiplication by a transformation matrix, the positions of individual pixels of a tile, in particular of the four corner points, which are preferably given by support vectors, are multiplied by the transformation matrix. In this case, support vectors are vectors which specify the position of a pixel relative to an origin, wherein the origin may be in particular a corner point or midpoint of a tile or of the image, i.e. of the rendered or captured image content. As a result of the multiplication of the support vectors by the transformation matrix, the position of the individual pixels of the tile shifts relative to the origin. Preferably, pixels which lie between these displaced pixels, in particular in a manner adjoining the latter, are interpolated, in particular by a linear interpolation. Preferably, gaps in the image content of the perspectively transformed tile are closed as a result.

Preferably, by the choice of the number and/or the dimensions, i.e. the size or area, of the tiles when dividing the image content to be displayed, the number of pixels to be interpolated linearly, in particular, can be determined, in particular limited, since the number of pixels per tile that have to be perspectively transformed decreases as the number of tiles increases. This ensures that in particular a linear interpolation of pixels that lie between displaced pixels, in particular in a manner adjoining displaced pixels, generates clear and distinct, perspectively transformed image content on the tiles or the combined perspectively transformed image content to be displayed via the head-up display or the display or to be output by the output unit, i.e. perspectively transformed image content without artifacts.

Preferably, the number and/or the dimensions of the tiles are/is chosen to be greater than a critical number and/or size for which the number of pixels to be interpolated linearly, in particular, is so small that artifacts, in particular corners, occur in the perspectively transformed image content. This ensures that the combined, perspectively transformed image content to be displayed via the head-up display or the display unit or to be output by the output unit has no artifacts, in particular corners. Preferably, the number and/or size of the tiles are/is chosen such that the tiles overlap, in particular in each case with one or two pixels.

In a further advantageous configuration of the method for the perspective transformation and outputting, in particular display, of a rendered or captured image content, the transformation matrix is chosen from a multiplicity of transformation matrices. In particular, the multiplicity of transformation matrices here preferably includes in each case a transformation matrix for each tile to be perspectively transformed. This can ensure that the transformation matrices are adapted to the beam path of the imaging of the tile to be perspectively transformed in each case in the head-up display, on the one hand, or to the imaging properties of the display unit, in particular with respect to the imaging properties of the sensor device that captures the image content, on the other hand, or can be adapted in particular individually to changes in the beam path of the imaging or the imaging properties of the display unit. With further preference, the multiplicity of transformation matrices includes various perspective transformations.

Any vectorial perspective transformation can be realized by the use of transformation matrices. As a result, the perspective transformation can be adapted particularly well to the beam path or the imaging properties. Particularly preferably, the perspective transformation carried out with a transformation matrix from the multiplicity of transformation matrices relates to at least one of the following features: trapezoid shape, curvature, stretching and/or compression, rotation, offset.

In a further advantageous configuration of the method for the perspective transformation and outputting, in particular display, of a rendered or captured image content, the perspective transformation of the individual tiles is carried out by a graphics module, preferably via a graphics programming interface, in particular OpenVG. The use of a graphics module significantly accelerates the perspective transformation of the individual tiles, in particular by means of hardware acceleration, and reduces the computational burden for a central processing unit (CPU). Preferably, a graphics programming interface is used which is in widespread use and is available as standard on microprocessors. With further preference, the graphics programming interface is available on a plurality of platforms. Furthermore, the graphics programming interface used preferably allows the use of a graphics module which makes available the hardware-accelerated processing or calculation of vector graphics.

In a further advantageous configuration of the method for the perspective transformation and outputting, in particular display, of a rendered or captured image content, the perspectively transformed tiles are stored in a buffer memory. The buffer memory allows particularly fast access to the perspectively transformed tiles stored therein, in particular during the process of combining to form an entire perspectively transformed image, or image content, to be displayed or to be output.

In a further advantageous configuration of the method for the perspective transformation and outputting, in particular display, of a rendered or captured image content, only a portion of the plurality of tiles is perspectively transformed and the remaining transformed tiles are loaded from the buffer memory for the purpose of combining the transformed image. As a result, the combination of the perspectively transformed image, or image content, to be displayed can be significantly accelerated. In particular, it is thus possible to achieve a frame rate at which rendered or captured image content is perspectively transformed of 30 to 90, preferably of 45 to 75, particularly preferably of substantially 60, perspectively transformed image contents per second. In one particularly advantageous configuration of the method, it is possible to achieve a value of 90 to 160, preferably of substantially 120, perspectively transformed image contents per second.

In a further advantageous configuration of the method for the perspective transformation and outputting, in particular display, of a rendered or captured image content, only that portion of the plurality of tiles is perspectively transformed which contains elements of the image content which have changed with respect to an image content that was previously to be transformed and to be output, in particular to be displayed and/or to be projected. In particular, the remaining perspectively transformed tiles required for combining the perspectively transformed tiles to form a perspectively transformed image content to be displayed are loaded from the buffer memory. This ensures, in particular, that a processor demanded by the perspective transformations processes only those parts of the rendered or captured image content which differ from the image content that was previously perspectively transformed and output, in particular displayed, i.e. contain changed information to be displayed or a changed representation of the information to be displayed, as a result of which the computing power of said processor is significantly reduced in comparison with carrying out a perspective transformation of all the tiles. As a result, the computing power of such a processor can be allocated particularly efficiently for calculations and a frame rate at which rendered or captured image content is perspectively transformed of 30 to 90, preferably of 45 to 75, particularly preferably of substantially 60, perspectively transformed image contents per second can be achieved. In one particularly advantageous configuration of the method, it is possible to achieve a value of 90 to 160, preferably of substantially 120, perspectively transformed image contents per second.

In a further advantageous configuration of the method for the perspective transformation and outputting, in particular display, of a rendered or captured image content, different portions of the plurality of tiles have different color depths, in particular 32, 24, 16, 8 and 4 bits. With further preference, different parts of the plurality of tiles can also have a color depth that lies between these values. With further preference, different parts of the plurality of tiles can also have a color depth that is greater than 32 bits or less than 4 bits. In particular, the tiles have in each case the smallest possible color depth for which the respectively contained image content can still be displayed or represented with true color, i.e. with no reduction in color quality. Preferably, the perspective transformations, in particular the preferably linear interpolations of individual pixels, of the plurality of tiles having the different color depths are carried out at the respective color depth of the tile that is to be perspectively transformed. This ensures that the perspective transformation or the perspectively transformed tile requires only little memory space or the preferably linear interpolation requires little computation demand. As a result, the perspective transformations, in particular the preferably linear interpolations of individual pixels, can be carried out particularly rapidly and efficiently.

In a further advantageous configuration of the method for the perspective transformation and outputting, in particular display, of a rendered or captured image content, the plurality of tiles are mirrored by a point or line mirroring during the perspective transformation and are combined to form a perspectively transformed, mirrored image content. As a result, the image orientation of the perspectively transformed image content to be displayed can be adapted to the beam path of the head-up display or to imaging properties of the display unit. In particular, the mirroring makes it possible to dispense with the use of additional optical elements in the head-up display which change, in particular rotate and/or mirror, the image orientation of the perspectively transformed image content for error-free imaging on the projection surface of the head-up display. As a result, in particular, the head-up display can be realized a particularly simple manner.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows an illustration of a grid and a distorted grid according to an embodiment of the invention.

FIG. 7 shows an illustration of envelopes of support points on a projection surface according to an embodiment of the invention.

FIG. 8 shows an illustration of a captured image content and the perspective transformation thereof according to an embodiment of the invention.

DETAILED DESCRIPTION OF THE DRAWINGS

Figure 1:
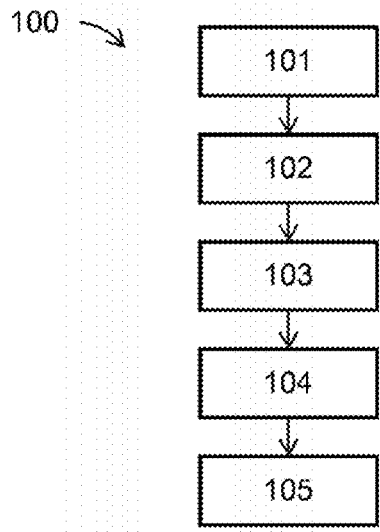
FIG. 1 shows one embodiment of the method according to the invention for the transformation and outputting, in particular display, of a rendered or captured image content by a head-up display or an output unit.

FIG. 1 shows one embodiment of the method 100 for the transformation and outputting, in particular display, of a rendered or captured image content by a head-up display or an output unit, in particular display unit, which is explained below with reference to the further figures.

Figure 2:
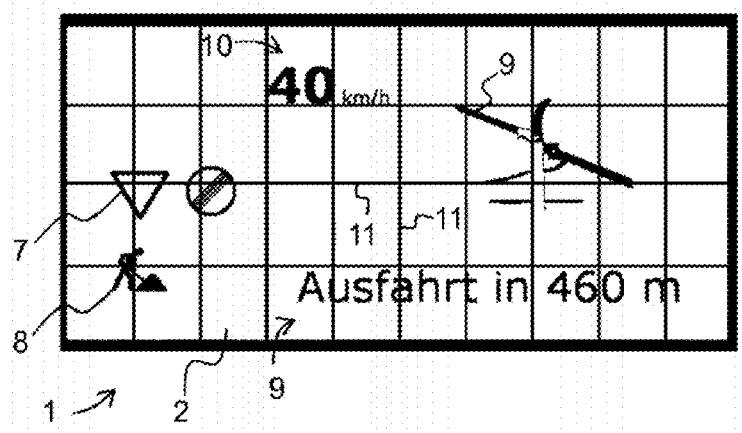
FIG. 2 shows an illustration of a rendered image content divided into a plurality of tiles by one embodiment of the method according to the invention.

FIG. 2 shows an illustration of a rendered image content 1 divided into a plurality of tiles 2 by one embodiment of the method 100 according to the invention. The image content 1 contains a plurality of elements 7, 8, 9, 10, which indirectly and/or directly concern the operation of the vehicle, in particular traffic regulations 7 to be complied with, warning indications 8, navigation information 9 and/or speed information 10. An element 7, 8, 9, 10 is in each case a portion of the entire image content 1. The elements 7, 8, 9 are preferably displayed and/or represented, or imaged, as pictograms. With further preference, the elements 9, 10 are displayed and/or represented, or imaged, as text characters and/or lettering, in particular number characters. The image content 1 is preferably rendered, such that it is present as a digital image, in particular as raster graphics. As a result, the image content 1 can easily be processed, i.e. changed and/or modified, in particular distorted, by digital methods, in particular transformations, preferably perspective transformations.

The rendered image content 1 is divided into a plurality of regions, in particular tiles 2, preferably rectangular tiles 2, in method step 101. With further preference, the tiles 2 are square. The edges of the tiles 2 are marked by horizontal and vertical lines 11 in the exemplary embodiment shown, for the sake of better clarity.

Preferably, individual tiles 2 enclose individual elements 7, 8, 9, 10 or portions of the elements 7, 8, 9, 10, i.e. that portion of the entire image content 1 which is contained in the individual tiles 2 represents individual elements 7, 8, 9, 10 or portions of the elements 7, 8, 9, 10.

Preferably, different tiles 2 have different color depths, in particular 32, 24, 16, 8 or 4 bits. With further preference, different tiles can also have a color depth that lies between these values. With further preference, different tiles can also have a color depth that is greater than 32 bits or less than 4 bits. With further preference, the color depth of a tile 2 has a magnitude only such as is necessary for clear and distinct, i.e. true-color, representation of that portion of the image content 1 which is contained in the tile 2. In particular, tiles 2 that contain no elements 7, 8, 9, 10 of the image content 1 have a particularly low color depth, for example 4 bits or 1 bit. Preferably, tiles 2 that contain single-colored elements 7, 8, 9, 10 or single-colored portions of the elements 7, 8, 9, 10, in particular text characters or lettering and/or number characters, have a low color depth, in particular 16, 8 or 4 bits, or a value between these values. The memory space of the rendered image content 1 or of the individual tiles 2 can be significantly reduced as a result.

Figure 3:
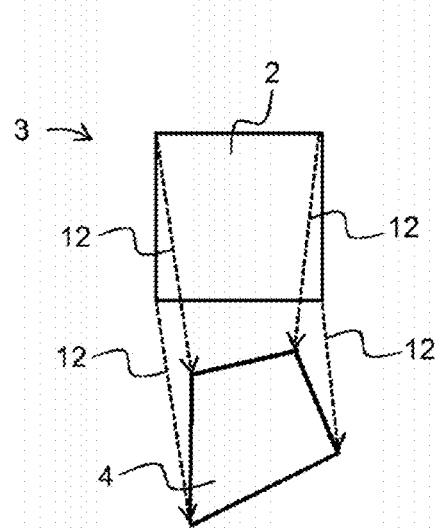
FIG. 3 shows an illustration of a perspective transformation of a tile according to an embodiment of the invention.

FIG. 3 shows an illustration of a perspective transformation 3 of a tile 2. In method step 102, the perspective transformation 3 generates a perspectively transformed tile 4 from a, preferably rectangular, in particular square, tile 2.

Preferably, the perspective transformation 3 is implemented by a matrix multiplication, in particular the multiplication by a transformation matrix, for instance a 3×3 matrix, in method step 102. In this case, the individual pixels, in particular the four corner points, of the tile 2 which are indicated by support vectors, said tile preferably being present as raster graphics, are multiplied by a matrix that generates a perspective transformation. Support vectors are vectors that specify the position of the pixels with respect to an origin, in particular with respect to one of the four corners of the tile 2 or of the image composed of the tiles 2, i.e. the rendered or captured image content 1, 1', or the midpoint of the tile 2 or of the image composed of the tiles 2, i.e. the rendered or captured image content 1, 1'.

As a result of the perspective transformation 3, in particular as a result of the multiplication of the support vectors by a transformation matrix, in the exemplary embodiment shown, the four corner points of the tile 2 are assigned a new position in method step 102, indicated by the four dashed arrows 12. In particular, magnitude, i.e. length, and direction, i.e. orientation, of the support vectors of the pixels to be perspectively transformed change in this case.

If the perspective transformation 3 in method step 102 gives rise to gaps between the pixels of the perspectively transformed tile 4, said gaps are preferably closed by an interpolation, in particular by a linear interpolation, in method step 103. In particular, pixels which adjoin and/or lie or are arranged between pixels displaced by the perspective transformation 3 are assigned a value by the interpolation, such that the perspectively transformed tile 4 has a gap-free portion of the transformed image content 5, i.e. is representable without artifacts. Preferably, a smoothing of the perspectively transformed image content is carried out by the linear interpolation in method step 103, such that said image content is representable in a manner free of artifacts by a head-up display or a display unit.

Figure 4:
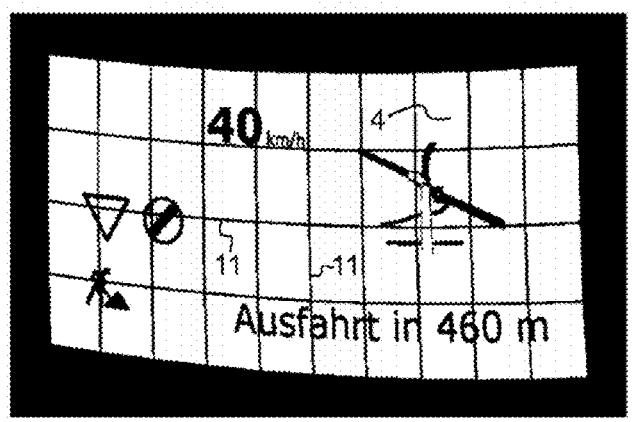
FIG. 4 shows an illustration of an image content transformed by perspective transformations of individual tiles by one embodiment of the method according to the invention.

FIG. 4 shows an illustration of a transformed image content 5 that was combined by one embodiment of the method 100 according to the invention and was produced in method step 104 by perspective transformations 3 of individual tiles 2 in method step 102. For the sake of better clarity, the edges of the perspectively transformed tiles 4 are shown by substantially horizontal and substantially vertical lines 11 as in FIG. 1.

Individual tiles 2 are transformed by respectively different perspective transformations 3, in particular respectively different transformation matrices, i.e. modularly, during the perspective transformation 3 in method step 102 and are combined to form a perspectively transformed image content 5 in method step 104. In method step 105, the perspectively transformed image content 5 is preferably projected by a head-up display onto a projection surface assigned to the head-up display, or is displayed by a display unit, where it is visually perceived by a user, in particular the driver, as an undistorted image. In method step 105, however, the perspectively transformed image content 5 can also be output, in particular by an output unit, for example as data via a corresponding data interface. Preferably, the perspectively transformed image content 5 is made available to a driver assistance device in this case.

As a result of the separate, i.e. modular, perspective transformation 3 in method step 102, each perspectively transformed tile 4 preferably acquires a different shape than adjoining perspectively transformed tiles 4. In particular, this results in a closed or continuous, preferably artifact-free, transformed image content 5 that can be represented or displayed as a closed or continuous, preferably artifact-free, image. Preferably, by means of the separate perspective transformations 3, adjoining tiles 2 are perspectively transformed in a manner such that their edges adjoin one another in a closed, i.e. flush, manner. With further preference, for each tile 2 a perspective transformation 3 is chosen from a multiplicity of perspective transformations 3, or the perspective transformation 3 is adapted, in particular separately, for each tile 2, such that after the perspective transformation 3 and combination with adjacent perspectively transformed tiles 4, a closed, artifact-free, perspectively transformed image content 5 results. In particular, the respective perspective transformations 3 are chosen or adapted for individual tiles 2 such that after combination to form the perspectively transformed image content 5, no edges, bends, discontinuities and/or noise occur(s) in the perspectively transformed image content 5 or the representable, perspectively transformed image.

With further preference, the rendered or captured image content 1, 1' is divided into tiles 2 having overlapping edges in method step 101 before the perspective transformation 3, i.e. a portion of the rendered or captured image content 1, 1' is represented by more than one tile 2 or is contained in more than one tile 2. In particular, the edges of adjoining tiles 2 overlap. The overlapping edges, i.e. the overlapping region, can have different widths, in particular 1, 2, 3 or more pixels. With further preference, the width of the overlapping edges is chosen or adapted such that during the process of combining the perspectively transformed tiles 4 to form a perspectively transformed image content 5 in method step 104, each region of the perspectively transformed image that is representable or displayable and/or imageable by the perspectively transformed image content 5 is covered by at least one perspectively transformed tile 4. As a result, the edges of the perspectively transformed tiles 4 need not adjoin one another in a closed, i.e. flush, manner, with the result that there is greater freedom in the choice of the appropriate perspective transformations 3 for an individual tile 2, or the adaptation of the perspective transformation 3 to an individual tile 2. In particular, as a result, perspectively transformed tiles 4 have to adjoin one another only in a substantially closed, i.e. flush, manner.

Preferably, during the process of combining to form a perspectively transformed image content 5 in method step 104, the overlapping region or the overlapping edges of the perspectively transformed tiles 4 is or are smoothed, in particular averaged or interpolated, in a manner such that a seamless transition between adjoining perspectively transformed tiles 4 results. Artifacts, in particular edges, bends, discontinuities and/or noise, in the combined perspectively transformed image content 5 are avoided particularly reliably as a result.

Figure 5:
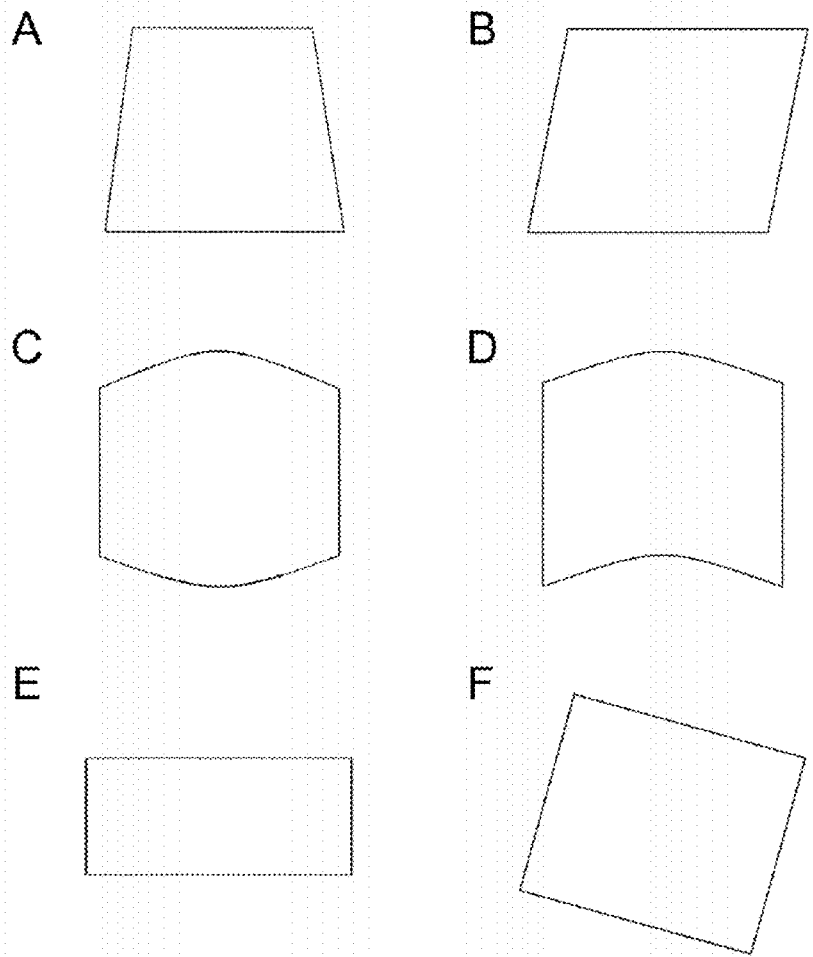
FIG. 5 shows illustrations of several results of basic perspective transformations according to embodiments of the invention.

FIG. 5 shows several results of basic perspective transformations 3 of individual and/or a plurality of tiles 2.

FIG. 5A shows the result of a perspective transformation 3 which perspectively transforms a rectangular tile 2 into a trapezoidal tile.

FIG. 5B shows the result of a perspective transformation 3 which perspectively transforms a rectangular tile 2 into a parallelogram-shaped tile. This is a special case of FIG. 5A.

FIG. 5C shows the result of a perspective transformation 3 which perspectively transforms a rectangular tile 2 into a curved or barrel-shaped tile having two convex opposite sides.

FIG. 5D shows the result of a perspective transformation 3 which perspectively transforms a rectangular tile 2 into a curved or twisted tile having a convex and a concave opposite side. This is a special case of FIG. 5C.

Preferably, the perspective transformations 3 shown in FIGS. 5C and D are realized by dividing the tile 2 into further, in particular smaller, tiles and perspectively transforming the latter by means of one or more perspective transformations 3 in a manner such that the desired tile shape, for example the curved or barrel-shaped or twisted tile having convex and/or concave opposite sides, is brought about during combination of the further, in particular smaller, tiles.

FIG. 5E shows the result of a perspective transformation 3 which perspectively transforms a rectangular tile 2 into a compressed or stretched tile.

FIG. 5F shows the result of a perspective transformation 3 which perspectively transforms a rectangular tile 2 into a tile that is rotated, i.e. turned by a specific angle, in particular in relation to the rectangular tile 2.

Preferably, the perspective transformation 3 of an individual tile 2 is composed of a plurality of basic perspective transformations 3, the results of which are shown in FIGS. 5A to F. As a result, it is possible, for each individual tile 2, to choose a perspective transformation 3 from a multiplicity of perspective transformations 3 or to adapt the perspective transformation 3 such that after the process of combining the perspectively transformed tiles 4 in method step 104, a particularly artifact-free, perspectively transformed image content 5, which in particular is free of edges, bends, discontinuities and/or noise, results.

In order to determine the manner in which a rendered or captured image content 1, 1' has to be perspectively transformed in method step 102 in order to be displayed to the driver of a vehicle as an undistorted image in method step 105, a regular, in particular conventional, grid 13 is distorted, such that the distortion corresponds to an adaptation to the beam path of the head-up display or the imaging properties of the display unit.

FIG. 6 shows an illustration of a regular grid 13 (upper part of the figure) and of a distorted grid 14 resulting from the distortion (lower part of the figure). The grid points 15 of the regular grid 13, illustrated as crosses, are used or taken into account when dividing the rendered or captured image content 1, 1' into a plurality of tiles 2. The grid points 16 of the distorted grid 14, illustrated as dots, are used or taken into account when selecting the appropriate perspective transformation 3 or adapting the perspective transformation 3 of an individual tile 2 that is to be perspectively transformed. This reliably ensures, for example, that the perspective transformation of the rendered or captured image content 1, 1' in method step 102 corresponds to the adaptation to the beam path of the head-up display or the imaging property of the display unit.

Preferably, the distortion of the regular grid 13, i.e. the conversion into a distorted grid 14, is performed by a perspective transformation 3 or a combination of the basic perspective transformations 3, the results of which are shown in FIG. 5.

With further preference, the grid points 15 of the regular grid 13 indicate the position of the tiles 2. With further preference, the grid points 16 of the distorted grid 14 indicate the position of the perspectively transformed tiles 4. In particular, the grid points 15 of the regular grid 13 function as initial support points of the tiles 2, preferably as the midpoint thereof or one of their corner points. In particular, the grid points 16 of the distorted grid 14 function as target support points of the perspectively transformed tiles 4, preferably as the midpoint thereof or one of their corner points.

FIG. 7 shows an illustration of the distribution of rendered or captured image content or of image content—perspectively transformed according to the method—of a rendered or captured image content on an image-generating unit. The image-generating unit is designed to represent or to image image content as image on a display 6 in method step 105, wherein the display 6 can be part of a head-up display or a display unit. From the display 6, preferably only a specific transformation region 17, represented by the dashed line, is provided for representing or imaging the perspectively transformed image content. The perspective transformations of the individual tiles are preferably chosen or adapted such that in method step 102 perspectively transformed image content does not project beyond the transformation region 17.

Before the perspective transformation in method step 102, rendered image content would be represented without distortion for example within an initial region 19 on the display 6. In order to ensure a distortion-free visual perception by a user during an imaging of the rendered image content by a head-up display, however, the representation of the rendered image content on the display 6 has to be adapted to the beam path of the head-up display. The correspondingly perspectively transformed image content is then represented in a distorted manner within a target region 18 on the display 6, such that the distortion of the represented image content that is caused by the beam path of the head-up display is precisely compensated for.

By contrast, before the perspective transformation in method step 102, image content captured in a sensor-based manner, for instance by means of one or more cameras having fish-eye lenses, would be represented in a distorted manner for example within the target region 18 on the display 6. In order to ensure a distortion-free visual perception by the user during an imaging of the captured image content by the display 6, however, the captured image content therefore has to be adapted to the imaging properties of the display 6, in particular with regard to the imaging properties of the capturing sensor device. The correspondingly perspectively transformed image content is then represented without distortion within the initial region 19 on the display 6.

In the case of rendered image content, the grid points 16 of the distorted grid 14 illustrated in FIG. 6 preferably lie within the target region 18, illustrated by a thin dotted line, which in particular is part of the transformation region 17. The target region 18 functions as envelope of the grid points 16 of the distorted grid or of the target support points of the perspectively transformed tiles 4. The target region 18 is preferably smaller than the transformation region 17 since the perspectively transformed tiles 4 have a lateral extent, and this prevents perspectively transformed tiles 4 and thus parts of the perspectively transformed image content 5 from projecting beyond the transformation region 17.

Correspondingly, in this case, the position of the grid points 15 of the regular grid 13 is displayed by the initial region 19, illustrated by a solid thin line. The initial region functions as envelope of the grid points 15 of the regular grid 13 or of the initial support points of the tiles 2. The initial region 19 is preferably smaller than the transformation region 17 since the position of individual tiles 2 can be displaced by the perspective transformation 3 toward the edge of the display 6 or toward the edge of the transformation region 17 or the lateral extent of individual tiles 2 can increase. This reliably ensures that rendered image content 1 divided into a plurality of tiles 2 does not project beyond the display 6 or the transformation region 17 of the display 6 after the perspective transformation 3 and combination of the individual tiles 2 to form a perspectively transformed image content 5.

An image content (1') captured by a camera is illustrated in the left-hand section of FIG. 8. In this case, the image content (1') represents at least one portion of the vehicle environment such as is captured for example by a camera having a fish-eye lens at the rear of the vehicle. A large field of view, i.e. a large angular range, is covered by the fish-eye lens. However, this results in a distortion of the captured image content (1').

For the undistorted representation of the captured image content (1') on a display, the captured image content (1') is divided into a plurality of regions, in particular tiles 2, by lines 11 depicted by way of example. In this case, the lines 11 define the edges of the tiles 2.

In the present example, said regions, as illustrated, are not rectangular. In particular, the tiles 2 are not uniform, i.e. they have different shapes and/or sizes depending on their position within the captured image content (1').

Each of the tiles 2 is perspectively transformed, in particular by a matrix multiplication, preferably using a 3×3 transformation matrix. Preferably, in this case, each of the tiles 2, depending on its position within the captured image content (1'), is perspectively transformed with the aid of a transformation matrix from a group of different transformation matrices.

Preferably, during the process of combining the perspectively transformed tiles 4, this results in a perspectively transformed image content 5 that corresponds to a rectified image of the image content (1') captured in a sensor-based manner. This is illustrated in the right-hand section of FIG. 8.

Alternatively, however, a partly distorted perspectively transformed image content 5 can also be generated. In particular, by way of example, edge regions of the perspectively transformed image content 5 could be compressed in order to bring about an increased information density, for example an extended field of view, in the edge region.

The method according to the invention can be used, in particular, to fuse image contents 1' captured separately by a plurality of cameras. Here the plurality of image contents 1' are in each case divided into a plurality of regions, in particular tiles 2, and the perspective transformations for the individual regions 2 in the plurality of image contents 1' are chosen in such a way that the resulting perspectively transformed tiles 4 can be combined to form a single, contiguous perspectively transformed image content 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Rendered image content
1' Captured image content
2 Tile
3 Perspective transformation
4 Perspectively transformed tile
5 Transformed image content 6 Display
7 Traffic regulations
8 Warning indication
9 Navigation information
10 Speed information
11 Tile edge
12 Arrow
13 Regular grid
14 Distorted grid
15 Grid point of the regular grid
16 Grid point of the distorted grid
17 Transformation region
18 Target region
19 Initial region
100 Method for the perspective transformation and outputting of a rendered or captured image content by a head-up display or an output unit
101 Dividing the rendered or captured image content into a plurality of tiles
102 Perspectively transforming a plurality of tiles
103 Interpolation
104 Combining perspectively transformed tiles to form a perspectively transformed image content
105 Projecting or outputting perspectively transformed image content onto a projection surface by means of a head-up display or by means of an output unit

What is claimed is:

1. A method for perspective transformation and display of a rendered image content by a head-up display, comprising the acts of:
    dividing the rendered image content into a plurality of tiles;
    transforming individual ones of the plurality of tiles by perspective transformation;
    storing the perspectively transformed tiles in a buffer memory;
    combining the perspectively transformed tiles into a transformed image content; and
    projecting the perspectively transformed image content onto a projection surface assigned to the head-up display,
    wherein
        only a portion of the individual ones of the plurality of tiles is perspectively transformed,
        the portion of the individual ones of the plurality of tiles is perspectively transformed includes individual ones of the plurality of tiles which are changed relative to tiles of a perspectively transformed image previously stored in the buffer memory, and
        during the act of combining the individual perspectively transformed tiles, the remaining individual ones of the plurality of tiles which were not changed relative to the perspectively transformed image previously stored in the buffer memory are retrieved from the buffer memory and combined with the portion the individual ones of the plurality of tiles perspectively transformed to form the perspectively transformed image content.

2. The method as claimed in claim 1, wherein the perspectively transformed image content is displayed on a display unit.

3. The method as claimed in claim 2, wherein the individual ones of the plurality of tiles are transformed such that the perspectively transformed image content is represented by the display unit in an uncompressed manner in at least one first region and in a compressed manner in at least one second region.

4. The method as claimed in claim 1, wherein during the transforming act, each of the individual ones of the plurality of tiles is perspectively transformed with regard to one or more of trapezoid shape, curvature, stretching, compression, rotation, and offset.

5. The method as claimed in claim 4, wherein adjoining tiles of the plurality of tiles have overlapping image contents.

6. The method as claimed in claim 1, wherein the image content is in the form of raster graphics, and individual pixels of the individual ones of the plurality of tiles are displaced by the perspective transformation.

7. The method as claimed in claim 6, wherein during the perspective transforming act, interpolation is performed between at least a portion of adjoining ones of the individual pixels of the individual ones of the plurality of tiles.

8. The method as claimed in claim 6, wherein during the perspective transforming act, the individual ones of the plurality of tiles are perspectively transformed by multiplication by a transformation matrix.

9. The method as claimed in claim 8, wherein the transformation matrix is chosen from a multiplicity of transformation matrices.

10. The method as claimed claim 1, wherein during the perspective transforming act, the perspective transformation of the individual ones of the plurality of tiles is carried out by a graphics module via a graphics programming interface.

11. The method as claimed in claim 1, wherein the portion of the individual ones of the plurality of tiles perspectively transformed include the individual ones of the plurality of tiles having elements of the image content changed with respect to image content previously stored in the buffer.

12. The method as claimed in claim 1, wherein different portions of the plurality of tiles have different color depths.

13. The method as claimed in claim 1, wherein during the perspective transformation act, the plurality of tiles are mirrored by a point or line mirroring, and during the combining act are combined to form a perspectively transformed, mirrored image content.

14. A head-up display for the perspective transformation and display of a rendered image content, comprising:
    a control unit including
        a first module configured to divide the rendered image content into a plurality of tiles and to store the perspectively transformed tiles in a buffer memory,
        a second module configured to transform individual ones of the plurality of tiles by perspective transformation, and
        a third module configured to combine the individual perspectively transformed tiles into a transformed image content; and
    a projection unit configured to project the perspectively transformed image content onto a projection surface assigned to the head-up display,
    wherein
        the second module is configured to perspectively transform only a portion of the individual ones of the plurality of tiles,
        the portion of the individual ones of the plurality of tiles includes individual ones of the plurality of tiles which are changed relative to tiles of a perspectively transformed image previously stored in the buffer memory, and the third module is configured to, during the combining of the individual perspectively transformed tiles, retrieve from the buffer memory previously stored remaining individual ones of the plurality of tiles which were not changed relative to the perspectively transformed image, and combine previously stored remaining individual ones of the plurality of tiles which were not changed relative to the perspectively transformed image with the individual ones of the plurality of tiles perspectively transformed to form the perspectively transformed image content.

15. A vehicle, comprising:
a vehicle front window; and
a head-up display including
   a control unit including
      a first module configured to divide the rendered image content into a plurality of tiles and to store the perspectively transformed tiles in a buffer memory,
      a second module configured to transform individual ones of the plurality of tiles by perspective transformation, and
      a third module configured to combine the individual perspectively transformed tiles into a transformed image content; and
   a projection unit configured to project the perspectively transformed image content onto the vehicle front window,
wherein
   the second module is configured to perspectively transform only a portion of the individual ones of the plurality of tiles, and
   the portion of the individual ones of the plurality of tiles includes individual ones of the plurality of tiles which are changed relative to tiles of a perspectively transformed image previously stored in the buffer memory, and
   the third module is configured to, during the combining of the individual perspectively transformed tiles, retrieve from the buffer memory previously stored remaining individual ones of the plurality of tiles which were not changed relative to the perspectively transformed image, and combine previously stored remaining individual ones of the plurality of tiles which were not changed relative to the perspectively transformed image with the individual ones of the plurality of tiles perspectively transformed to form the perspectively transformed image content.

16. A vehicle, comprising:
a control unit including
   a first module configured to divide the rendered image content into a plurality of tiles and to store the perspectively transformed tiles in a buffer memory,
   a second module configured to transform individual ones of the plurality of tiles by perspective transformation, and
   a third module configured to combine the individual perspectively transformed tiles into a transformed image content; and
an output unit configured to output the perspectively transformed image content on a display unit in the vehicle,
wherein
   the second module is configured to perspectively transform only a portion of the individual ones of the plurality of tiles, and
   the portion of the individual ones of the plurality of tiles includes individual ones of the plurality of tiles which are changed relative to tiles of a perspectively transformed image previously stored in the buffer memory, and
   the third module is configured to, during the combining of the individual perspectively transformed tiles, retrieve from the buffer memory previously stored remaining individual ones of the plurality of tiles which were not changed relative to the perspectively transformed image, and combine previously stored remaining individual ones of the plurality of tiles which were not changed relative to the perspectively transformed image with the individual ones of the plurality of tiles perspectively transformed to form the perspectively transformed image content.

\* \* \* \* \*